(12) United States Patent
Chang (10) Patent No.: US 9,965,093 B2
(45) Date of Patent: May 8, 2018

(54) TOUCH SENSITIVE SYSTEM ATTACHING TO TRANSPARENT MATERIAL AND OPERATING METHOD THEREOF

(71) Applicant: EGALAX_EMPIA TECHNOLOGY INC., Taipei (TW)

(72) Inventor: Chin-Fu Chang, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 26 days.

(21) Appl. No.: 15/393,483

(22) Filed: Dec. 29, 2016

(65) Prior Publication Data

US 2017/0192594 A1    Jul. 6, 2017

(30) Foreign Application Priority Data

Dec. 31, 2015  (TW) .............................. 104144653 A (51) Int. Cl.
  *G06F 3/045* (2006.01)
  *G06F 3/041* (2006.01)
  *G06F 3/044* (2006.01)

(52) U.S. Cl.
  CPC ............ *G06F 3/0416* (2013.01); *G06F 3/044* (2013.01); *G06F 3/0412* (2013.01); *G06F 2203/04103* (2013.01); *G06F 2203/04104* (2013.01); *G06F 2203/04107* (2013.01)

(58) Field of Classification Search
  CPC ...... G06F 3/0354; G06F 3/041; G06F 3/0412; G06F 3/0416; G06F 3/044; G06F 3/0488; G06F 2203/04103; G06F 2203/04104; G06F 2203/04107
  See application file for complete search history.

(56) References Cited

U.S. PATENT DOCUMENTS

| | | | |
|---|---|---|---|
| 9,081,450 B1* | 7/2015 | Mohindra | G06F 3/044 |
| 9,201,521 B2* | 12/2015 | Li | G06F 3/043 |
| 9,411,445 B2* | 8/2016 | Kuan | G06F 3/041 |
| 2008/0062139 A1* | 3/2008 | Hotelling | G02F 1/13338 345/173 |
| 2008/0158185 A1* | 7/2008 | Westerman | G06F 3/0488 345/173 |
| 2009/0095540 A1* | 4/2009 | Zachut | G06F 3/044 178/18.03 |
| 2010/0044122 A1* | 2/2010 | Sleeman | G01D 5/2405 178/18.06 |
| 2011/0084929 A1* | 4/2011 | Chang | G06F 3/0416 345/173 |

(Continued)

*Primary Examiner* — Joe H Cheng
(74) *Attorney, Agent, or Firm* — WPAT, PC (57) ABSTRACT

The present application provides a touch sensitive system attaching to a transparent material. The touch sensitive system includes an electronic device and a shielding conductive material. The electronic device further includes a touch sensitive screen module having no cover glass and placed behind the transparent material; and a touch sensitive control module coupled to the touch sensitive screen module, having palm rejection function. The shielding conductive material attaches to the transparent material and shields at least part of the touch sensitive screen module. In case an external conductive object approximating or touching the shielding conductive material, the touch sensitive control module determines that the at least part of the touch sensitive screen module is touched by a palm.

20 Claims, 6 Drawing Sheets

(56) References Cited

U.S. PATENT DOCUMENTS

| | | | |
|---|---|---|---|
| 2011/0084934 A1* | 4/2011 | Tsuzaki | G06F 3/0412 345/174 |
| 2011/0084937 A1* | 4/2011 | Chang | G06F 3/0416 345/174 |
| 2012/0105362 A1* | 5/2012 | Kremin | G06F 3/03545 345/174 |
| 2012/0158629 A1* | 6/2012 | Hinckley | G06F 3/038 706/15 |
| 2012/0182238 A1* | 7/2012 | Lee | G06F 3/0416 345/173 |
| 2012/0262407 A1* | 10/2012 | Hinckley | G06F 3/038 345/173 |
| 2013/0038573 A1* | 2/2013 | Chang | G06F 3/044 345/174 |
| 2013/0155015 A1* | 6/2013 | Chang | G06F 3/044 345/174 |
| 2014/0104222 A1* | 4/2014 | Chang | G06F 3/044 345/174 |
| 2014/0362046 A1* | 12/2014 | Yoshida | G06F 3/044 345/174 |
| 2015/0109250 A1* | 4/2015 | Chang | G06F 3/0416 345/174 |

\* cited by examiner

TOUCH SENSITIVE SYSTEM ATTACHING TO TRANSPARENT MATERIAL AND OPERATING METHOD THEREOF

CROSS REFERENCE TO RELATED APPLICATIONS

The application claims priority under 35 U.S.C. 115 to Taiwan patent application, 104144653, filed on Dec. 31, 2015, the disclosures of which is incorporated herein by reference.

BACKGROUND OF THE INVENTION

1. Field of the Invention

The present invention relates to the field of touch sensitive system and operating method thereof, and more particularly, to a touch sensitive system attaching to a transparent material and operating method thereof.

2. Description of the Prior Art

Touch sensitive screens or panels are one of the main input/output devices of modern electronic apparatuses. A touch sensitive screen may provide an instinctive human-machine interface, very suitable for use in an environment where only few inputs are entered but a large amount of outputs are produced. For example, a displaying apparatus in public places might require users to input data on only few parameters or items, which few inputs are then sufficient for the displaying apparatus to output a large amount of information to the users through its screen and speaker.

In addition to using a displaying apparatus to electronically display, displaying of various actual things may be needed or added together with the electronic displays in exhibition places. In general, businesses or shops often or usually show actual things behind transparent glass windows to consumers or users. However, if an electronic device with a touch sensitive screen is presented behind a glass window, the glass window blocks up between the touch sensitive screen and the user(s), so the touch sensitive screen cannot be touched by the finger(s) of the user(s). This situation presents a disability condition that the touch sensitive screen of the electronic device can only display and is not able to receive touch input.

Currently there are two common solutions, one of which is to cut out a space on the glass window to directly expose or make the touch sensitive screen physically accessible. But this solution breaks the integrity of the glass window, and external forces may push the electronic device off and inside the glass window, which behavior may also result in stealing or damaging of other items displayed behind the glass window. The other common solution is simply to put the electronic device in front of or out of, rather than behind, the glass window, to enable direct touching and operating of it by the user(s). In this way, even if possible stealing and damaging of the electronic device and other items are not considered, this solution still faces the problem that the power supply of the electronic device may (need to) be disposed behind the glass window.

Considering the above disadvantages, there is urgent need in the market for an electronic device capable of providing users to operate the touch sensitive screen blocked by the glass window and providing the relating function(s) required in demonstrations.

SUMMARY OF THE INVENTION

In an embodiment of the present invention, it provides a touch sensitive system attaching to a transparent material. The touch sensitive system includes an electronic device and a shielding conductive material. The electronic device further includes a touch sensitive screen module having no cover glass and placed behind the transparent material; and a touch sensitive control module coupled to the touch sensitive screen module, having palm rejection function. The shielding conductive material attaches to the transparent material and shields at least part of the touch sensitive screen module. In case an external conductive object approximating or touching the shielding conductive material, the touch sensitive control module determines that the at least part of the touch sensitive screen module is touched by a palm.

In an embodiment of the present invention, it provides a touch sensitive method for a touch sensitive system attaching to a transparent material. The touch sensitive system includes a touch sensitive screen module without cover glass and a touch sensitive control module coupled to the touch sensitive screen module. The touch sensitive method includes the following steps, and except for causal relationship, the present invention is not limited to the execution order of these steps: setting the touch sensitive screen module up behind the transparent material; attaching a shielding conductive material to the transparent material and shielding at least part of the touch sensitive screen module; and turning on palm rejection function of the touch sensitive control module, wherein the touch sensitive control module determines that the at least part of the touch sensitive screen module is touched by a palm when an external conductive object approximates or touches the shielding conductive material.

In an embodiment of the present invention, it provides a touch sensitive system attaching to a transparent material. The touch sensitive system includes a first electronic device and a second electronic device. The first electronic device further includes: a first touch sensitive screen module set up behind the transparent material, wherein the first touch sensitive screen module has no cover glass; a first touch sensitive control module coupled to the first touch sensitive screen module; and a first processor module coupled to the first touch sensitive screen module and the first sensitive control module, wherein the first processor module is configured to perform a first program to make the first touch sensitive screen module display a first button and to perform a first function in response to the first button when the first touch sensitive control module reports that the first button has been touched. The second electronic device further includes: a second touch sensitive screen module set up behind the transparent material, wherein the second touch sensitive screen module has no cover glass; a second sensitive control module coupled to the second touch sensitive screen module; and a second processor module coupled to the second touch sensitive screen module and the second touch sensitive control module, wherein the second processor module is configured to perform a second program to make the second touch sensitive screen module display a second button and to perform a second function in response to the second button when the second touch sensitive control module reports that the second button has been touched. The touch sensitive system further includes: a first conductive material attaching to the transparent material in response to the first button; a second conductive material attaching to the transparent material in response to the second button; and a third conductive material attaching to the transparent material excepting for the zones of the first touch sensitive screen module and the second touch sensitive screen module, wherein the third conductive material connects the first conductive material and the second conductive material by a first conductive line and a second conductive line, respectively. Wherein, when an external conductive object approximates or touches the third conductive material, the first processor module performs the first function and the second processor module performs the second function.

In an embodiment of the present invention, it provides a touch sensitive method for a touch sensitive system attaching to a transparent material. The touch sensitive system includes a first electronic device and a second electronic device. The touch sensitive method includes the following steps, and except for causal relationship, the present invention is not limited to the execution order of these steps: setting up a first touch sensitive screen module of the first electronic device behind the transparent material, wherein the first touch sensitive screen module has no cover glass; setting up a second touch sensitive screen module of the second electronic device behind the transparent material, wherein the second touch sensitive screen module has no cover glass; making a first processor module of the first electronic device perform a first program to make the first touch sensitive screen module display a first button and perform a first function in response to the first button when a first touch sensitive control module of the first electronic device reports that the first button has been touched; making a second processor module of the second electronic device perform a second program to make the second touch sensitive screen module display a second button and perform a second function in response to the second button when a second touch sensitive control module of the second electronic device reports that the second button has been touched; attaching a first conductive material to the transparent material in response to the first button; attaching a second conductive material to the transparent material in response to the second button; attaching a third conductive material to the transparent material excepting for the zones of the first touch sensitive screen module and the second touch sensitive screen module, wherein the third conductive material connects the first conductive material and the second conductive material by a first conductive line and a second conductive line, respectively. Wherein, when an external conductive object approximates or touches the third conductive material, the first processor module performs the first function and the second processor module performs the second function.

In an embodiment of the present invention, it provides a touch sensitive system attaching to a transparent material. The touch sensitive system includes an electronic device. The electronic device further includes: a touch sensitive screen module set up behind the transparent material, wherein the touch sensitive screen module has no cover glass; a touch sensitive control module coupled to the touch sensitive screen module; and a processor module coupled to the touch sensitive screen module and the touch sensitive control module, wherein the processor module is configured to perform a program to make the touch sensitive screen module display a first button and a second button, and to perform a first function in response to the first button when the touch sensitive control module reports that the first button has been touched, and to perform a second function in response to the second button when the touch sensitive control module reports that the second button has been touched, and to perform a third function when the touch sensitive control module reports that the first and the second buttons have been touched simultaneously. The touch sensitive system further includes: a first conductive material attaching to the transparent material in response to the first button; a second conductive material attaching to the transparent material in response to the second button; and a third conductive material attaching to the transparent material excepting for the zones of the touch sensitive screen module, wherein the third conductive material connects the first conductive material and the second conductive material by a first conductive line and a second conductive line, respectively. Wherein, when an external conductive object approximates or touches the third conductive material, the processor module performs the third function.

In an embodiment of the present invention, it provides a touch sensitive method for a touch sensitive system attaching to a transparent material. The touch sensitive method includes the following steps, and except for causal relationship, the present invention is not limited to the execution order of these steps: setting up a touch sensitive screen module of an electronic device behind the transparent material, wherein the touch sensitive screen module has no cover glass; making a processor module of the electronic device perform a program to make the touch sensitive screen module display a first button and a second button, and perform a first function in response to the first button when a touch sensitive control module of the electronic device reports that the first button has been touched, and perform a second function in response to the second button when the touch sensitive control module reports that the second button has been touched, and perform a third function when the touch sensitive control module reports that the first and the second buttons have been touched simultaneously; attaching a first conductive material to the transparent material in response to the first button; attaching a second conductive material to the transparent material in response to the second button; attaching a third conductive material to the transparent material excepting for the zones of the touch sensitive screen module, wherein the third conductive material connects the first conductive material and the second conductive material by a first conductive line and a second conductive line, respectively. Wherein, when an external conductive object approximates or touches the third conductive material, the processor module performs the third function.

In summary, the embodiments provided by the present invention can solve the problems mentioned above and let users be able to operate the touch sensitive screen blocked by the glass window and provide the relating function(s) required in demonstrations.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE
PREFERRED EMBODIMENTS

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Figure 1A:
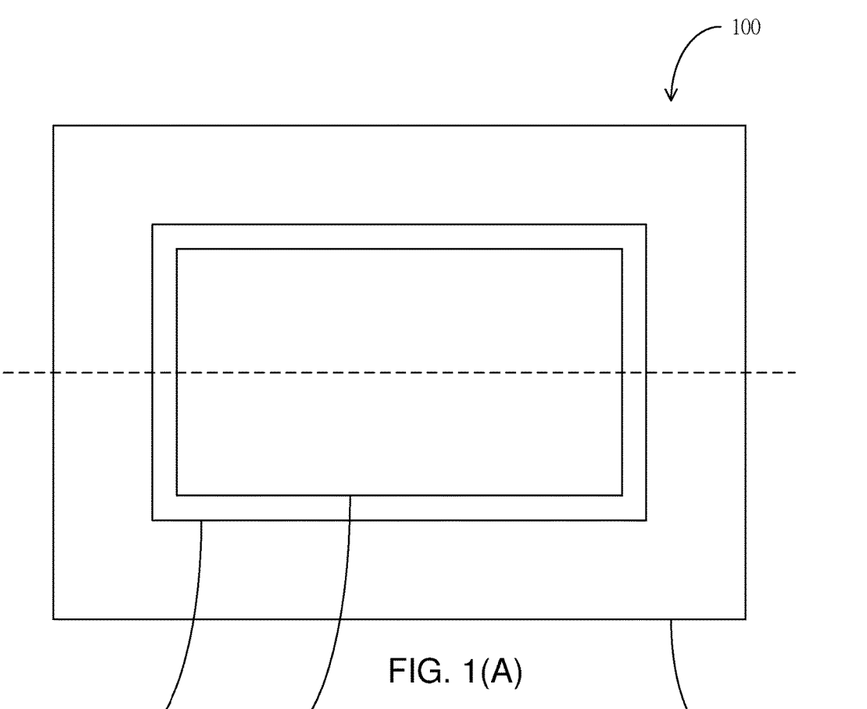
FIGS. 1(A) and 1(B) illustrate a touch sensitive system 100 according to an embodiment of the present invention.
Figure 1B:
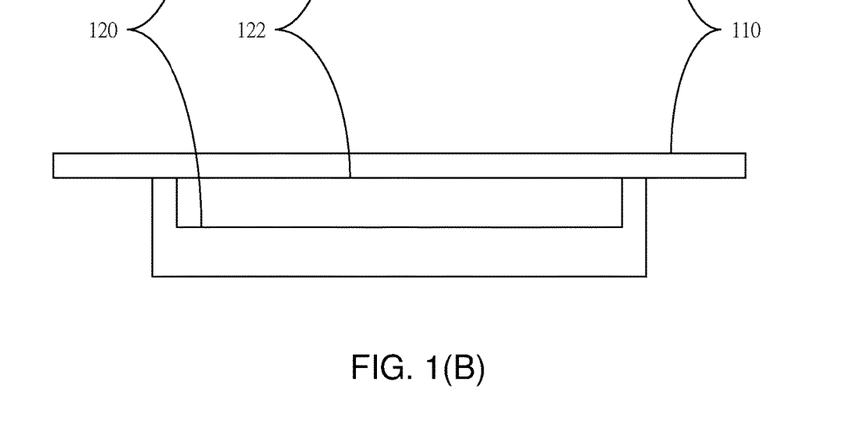

Referring to FIGS. 1(A) and 1(B), a touch sensitive system 100 according to an embodiment of the present invention is illustrated. The touch sensitive system 100 includes a transparent material 110 and an electronic device 120 behind the transparent material 110, wherein the electronic device 120 includes a touch sensitive screen module 122. FIGS. 1(A) and 1(B) include parts (A) and (B), which part (A) is a front or top view of the touch sensitive system 100 and includes a dotted line indicating cross-sectioning, and which part (B) is a cross-sectional view of the touch sensitive system 100 along the dotted line.

In some embodiments, the transparent material 110 may be glass, acrylic sheet, or other transparent insulative material. In some embodiments, the area of the transparent material 110 is bigger than that of the electronic device 120.

In some embodiments, the touch sensitive screen module 122 includes a screen and at least a touch sensitive layer, which at least one touch sensitive layer may include one of various transparent electrodes made of indium tin oxide (ITO), or may include two transparent electrodes made of ITO. In some embodiments, the touch sensitive screen module 122 is a liquid crystal panel including an on-cell touch sensitive structure, which refers to a structure wherein the touch sensitive function(s) is embedded between the color filter substrate and the polarization plate. In some embodiments, the touch sensitive screen module 122 is a liquid crystal panel including an in-cell touch sensitive structure, which refers to a structure wherein the touch sensitive function(s) is embedded among liquid crystal pixels. A person of ordinary skill in the art can understand that there may be various implementations of the touch sensitive screen module 122, including but not limited to capacitive, surface capacitive, and projective capacitive implementations, and the structure of the touch sensitive screen module 122 has implementations not limited to such touch sensitive layer, on-cell touch sensitive structure, and in-cell touch sensitive structure, all mentioned above.

In some embodiments, the feature of the touch sensitive screen module 122 is that there is no any transparent protection layer on the touch sensitive screen module 122. However, the touch sensitive screen modules of existing electronic devices all have a protection glass layer individually. For example, smart phone, iPhone, produced by Apple Inc. uses gorilla glass produced by Corning Inc.

In some embodiment, the electronic device 120 is included in the package structure around the touch sensitive screen module 122. The electronic device 120 may attach or laminate (or other connecting manners) the transparent material 110 by the package structure. When user's finger or other external conductive object touches the transparent material 110, the touch sensitive screen module 122 back or under the transparent material 110 senses the user's finger or the external conductive object, in this way, user can input data to the electronic device 120. In some embodiments, air still exists between the transparent material 110 and the touch sensitive screen module 122.

Since the thickness of the transparent material 110 may be different, a user can set up or configure the electronic device 120 to adjust the sensitiveness of the touch sensitive screen module 122. For example, when the thickness of the transparent material 110 is thicker, the user can adjust the touch sensitive screen module 122 to be more sensitive. Alternatively, when the thickness of the transparent material 110 is thinner, the sensitiveness of the touch sensitive screen module 122 may be adjusted to be lower. In some embodiments, the electronic device 120 includes a touch sensitive control module coupled to the touch sensitive screen module 122, the abovementioned sensitiveness is to adjust or change the touch sensitive control module. A person of ordinary skill in the art can understand that the touch sensitive control module has many implementations, such as being implemented by software, hardware, and combination of software and hardware. The present invention is not limited to the adjusting method for the sensitiveness of the touch sensitive screen module 122. One of the features of the present invention is to adjust the sensitiveness of touch sensitive screen module 122 according to the feature of the transparent material 110.

Compared to the prior art, the touch sensitive system 100 can protect the electronic device 120 in the transparent material 110 from stealing and damage. Besides, the electronic device 120 may set up or place anywhere of the transparent material 110.

Figure 2:
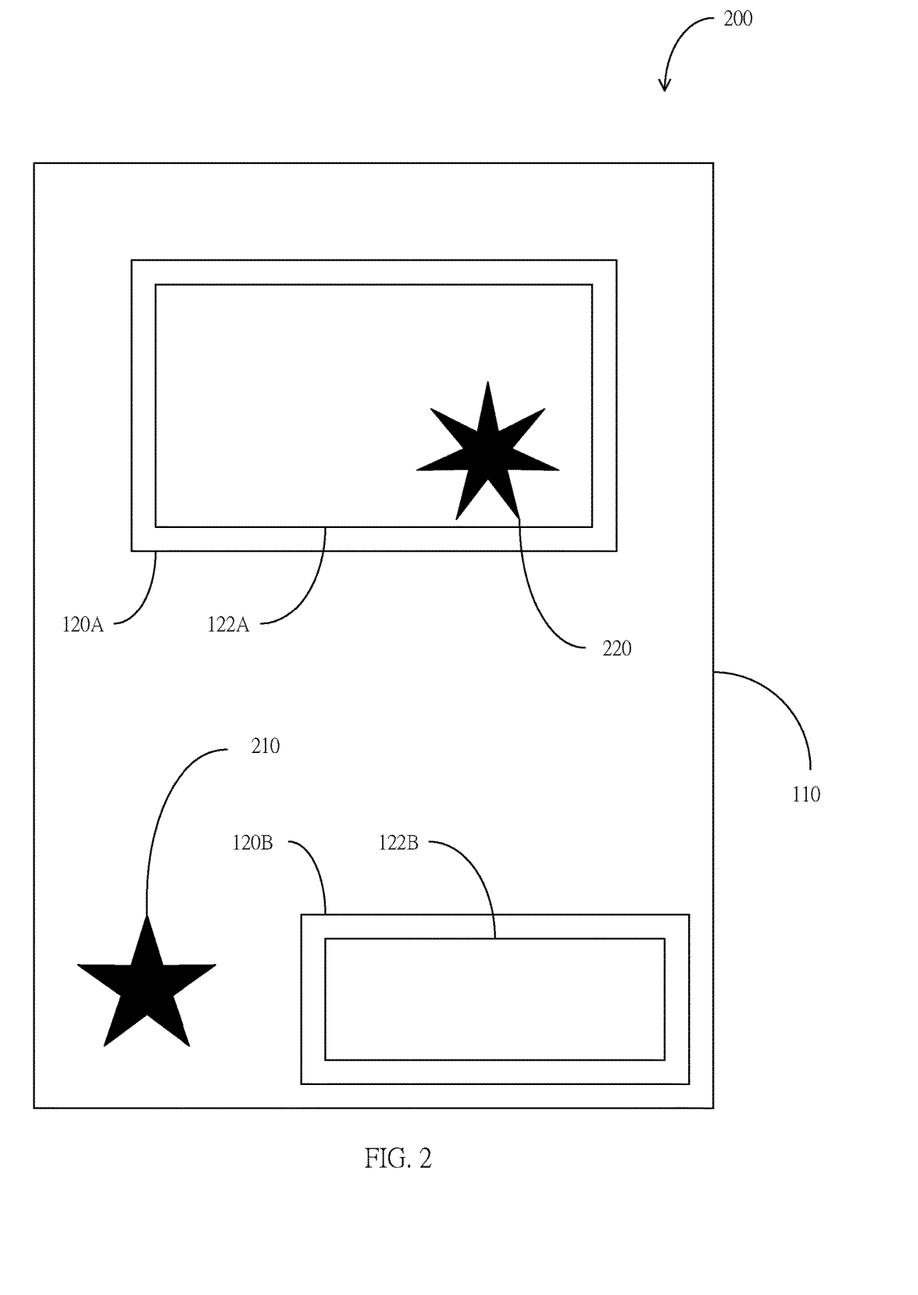
FIG. 2 illustrates a touch sensitive system 200 according to an embodiment of the present invention.

Referring to FIG. 2, a touch sensitive system 200 according to an embodiment of the present invention is illustrated. The touch sensitive system 200 includes the transparent material 110 mentioned above and multiple electronic devices 120 including a first electronic device 120A including a first touch sensitive screen module 122A, and a second electronic device 120B including a second touch sensitive screen module 122B. Compared to the touch sensitive system 100 of FIGS. 1(A) and 1(B), the touch sensitive system 200 may include multiple electronic devices 120 placed or disposed behind the same transparent material 110, wherein the size and way of disposition of each of the electronic devices 120 can be adjusted as by users and therefore distinct. And a user can perform inputs to the first touch sensitive screen module 122A and the second touch sensitive screen module 122B respectively.

Besides, the transparent material 100 may further include at least one non-transparent or semi-transparent insulative material, such as text explanation block and/or decoration pattern for providing users to read. In some embodiments, the insulative material mentioned above may be a sticker or stickers sticking outside or inside of the transparent material 110, that is, the side near to the users or the side away from the users.

As shown in FIG. 2, the transparent 110 includes a pentagram or five-pointed star insulative material 210 and a heptagram or seven-pointed star insulative material 220 thereon. The five-pointed star insulative material 210 does not block or shield the first touch sensitive screen module 122A and the second touch sensitive screen module 122B. The seven-pointed star insulative material 220 blocks or shields parts of the first touch sensitive screen module 122A. Since the insulative material 220 cannot impair the touch sensitive function of the first touch sensitive screen module 122A, when user's finger or other external conductive object approximates or touches the insulative material 220, the first touch sensitive screen module 122A still can sense user's finger or the external conductive object.

The embodiment in FIG. 2 mainly discloses that multiple electronic devices 120 may be disposed or placed behind the same transparent material 110, which electronic devices 120 each includes a touch sensitive screen module 122. In addition, the transparent material 110 may include at least one non-transparent or semi-transparent insulative material to be viewed by users without interfering inputs to the touch sensitive screen module 122 performed by the users.

In some embodiments, the transparent material 110 may itself include semi-transparent or non-transparent portion(s). For example, the transparent material 110 may include heterogeneous glass or acrylic sheet(s), and in the manufacturing process dyes may be added to form pictures and/or texts on certain portions of the substance. In some embodiments, the transparent material 110 may include laminated glass or acrylic material, and some material may be inserted among its layers to form pictures and/or texts on certain portions of the transparent material 110. In some embodiments, light sensing material or photo-sensor(s) may be added into part of or all the transparent material 110, so that optical characteristics such as refractive index, reflectivity, or scattering rate of the transparent material 110 can be changed with the strength of light received by the transparent material 110.

Figure 3:
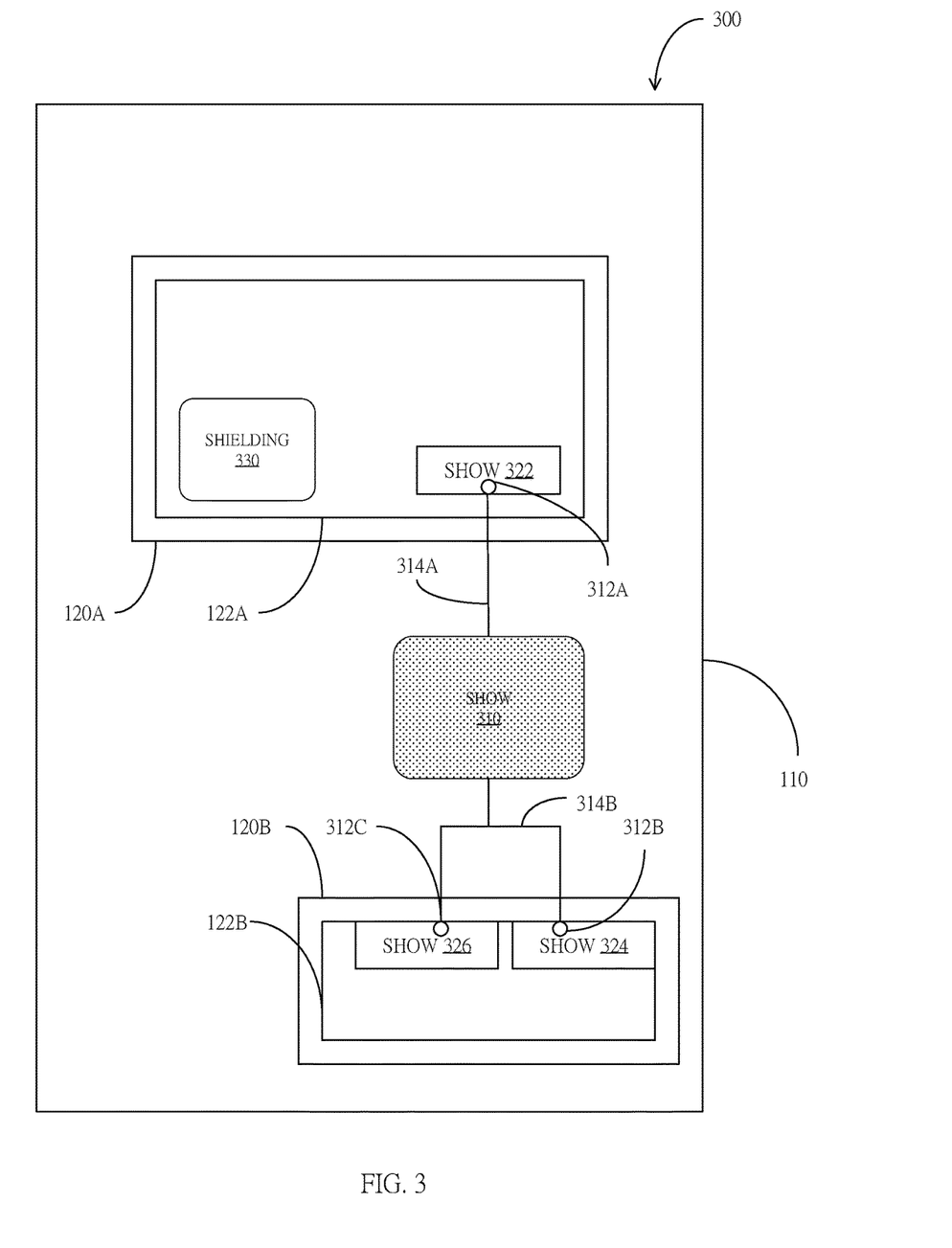
FIG. 3 illustrates a touch sensitive system 300 according to an embodiment of the present invention.

Referring to FIG. 3, a touch sensitive system 300 according to an embodiment of the invention is illustrated. The touch sensitive system 300 includes the transparent material 110 mentioned above and multiple electronic devices 120 including a first electronic device 120A including a first touch sensitive screen module 122A, and a second electronic device 120B including a second touch sensitive screen module 122B. Compared to the touch sensitive system 100 of FIGS. 1(A) and 1(B), the touch sensitive system 300 may include multiple electronic devices 120 disposed or placed behind the same transparent material 110, wherein the size and way of disposition of each of the electronic devices 120 can be adjusted as by users and therefore distinct. And a user can perform inputs to the first touch sensitive screen module 122A and the second touch sensitive screen module 122B respectively.

The first electronic device 120A shown in FIG. 3 may perform a first program to make a first button 322 show on somewhere of display thereof. When user's finger touches the first button 322, a first function relating to the first button 322 is launched or performed. Similarly, the second electronic device 120B shown in FIG. 3 may perform a second program to make a second button 324 and a third button 326 show on somewhere of display thereof. When user's finger touches the second button 324, a second function relating to the second button 324 is launched or performed. When user's finger touches the third button 326, a third function relating to the second button 326 is launched or performed. In some embodiments, when user's fingers simultaneously touch the second and the third buttons, a fourth function is launched or performed.

In some embodiments, the first program and the second program mentioned above are the same program, the displaying position and the size of the first button 322 are the same as those of the second button 324. However, in some embodiments, the first program and the second program are different, the displaying positions and/or the sizes of the first button 322, the second button 324, and the third button 326 are different. A person of ordinary skill in the art can understand that the present invention is not limited to whether the programs performed by multiple electronic devices 120 are the same or not, whether the button positions and/or the sizes displayed by the electronic device are the same or not.

The touch sensitive system 300 further includes a conductive material 310, which may be a film plying or attaching to the obverse and reverse of the transparent material 110. The position of the conductive material 310 may be anywhere excluding the first touch sensitive screen module 122A and the second touch sensitive screen module 122B. The conductive material 310 may include texts and/or pictures thereon for providing users to read to indicate that the users use their finger(s) or other external conductive object to touch the area of the conductive material 310.

The touch sensitive system 300 further includes a first conductive material 312A, a second conductive material 312B, and a third conductive material 312C on the positions displayed the first button 322, the second button 324, and the third button 326, correspondingly. The first conductive material 312A, the second conductive material 312B, and the third conductive material 312C connect the conductive material 310 by a first conductive line 314A and a second conductive line 314B respectively. In some embodiments, the first and the second conductive lines 314A and 314B and the first, the second and the third conductive materials 312A, 312B, and 312C may be transparent, such as, for example, transparent ITO electrodes mentioned above, however, they may also be non-transparent or semi-transparent conductive material. A person of ordinary skill in the art can understand that the present invention is not limited to transparent, semi-transparent, or non-transparent.

When a user uses his finger or other external conductive object to touch the area of the conductive material 310, the effect is the same as that the user uses his finger or external conductive object to touch the first, the second, and the third buttons 322, 324, and 326 at the same time because the first, the second, and the third conductive materials 312A, 312B, and 312C connect the conductive material 310 by the first and the second conductive lines 314A and 314B respectively. Accordingly, the first electronic device 120A and the second electronic device 120B respectively launch or perform the first function and fourth function relating to the first button 322, the second button 324 and the third button 326. In other words, user's single touch may launch relating functions of multiple electronic devices 120.

As shown in FIG. 3, the position of the second button 324 is on the edge of the second touch sensitive screen module 122B, thus the second conductive line 314B does not overlap the second touch sensitive screen module 122B. However, the position of the first button 322 is not on the edge of the first touch sensitive screen module 122A, thus parts of the first conductive line 314A overlaps the first touch sensitive screen module 122A. Accordingly, the overlapping parts of the first conductive line 314A and the first touch sensitive screen module 122A might result in the touch sensing of the first touch sensitive screen module 122A. However, the first program cannot launch relating function for the touch sensing of the overlapping parts, so the first conductive line 314A can cross parts of the first touch sensitive screen module 122A to connect the first button 322.

Above the first touch sensitive screen module 122A, the touch sensitive system 300 further includes at least a shielding conductive material 330. The shielding conductive material 330 operates to prevent induction of touch sensitive effect by a user on locations shielded by the shielding conductive material 330. For example, there may be a stop-execution button disposed on location that can be shielded and used to stop executing a first program running on a presented product, and when the presentation staff don't want the users to push the button, they may attach or stick the shielding conductive material 330 on the button and then activate the palm rejection function of the first touch sensitive screen module 122A. In this case, when a user uses his finger(s) or other external conductive object to touch the position of the shielding conductive material 330, since the shape and/or size of the shielding conductive material 330 would be regarded as like a palm by the first touch sensitive screen module 122A, this touch action by the user will thus be rejected. Therefore, the user cannot activate the stop-execution button by touching, and in turn as intended the first program will not be stopped by the user. In some embodiments, to prevent the user from noticing, the shielding conductive material 330 may be transparent.

Similarly, for avoiding being regarded as a palm to be rejected, the shape(s) and/or size(s) of the first, the second, and the third conductive materials 312A, 312B, and 312C must be controlled under the situation that they will not be seemed as palm by mistake. In other words, a person of ordinary skill in the art can understand that the shapes and/or sizes of the shielding conductive material 330 and the first conductive material 312A are different although they are all the conductive material. Accordingly, the first touch sensitive screen module 122A can respectively determines palm and normal touch sensitive point to achieve the effects of shielding and touching.

In addition, in the embodiment of FIG. 3, since the first, the second, and the third conductive materials 312A, 312B, and 312C are connected to each other by the conductive material 310, when a user wants to perform the function in response to only the first button 322, the second button 324, or the third button 326, the user should avoid touching the areas of the first, the second, and the third conductive material 312A, 312B, and 312C. In some embodiments, since the areas of the first, the second, and the third conductive material 312A, 312B, and 312C are all smaller than that of the conductive material 310, the touched area of the conductive material 310 touched by the user is bigger than those of the first, the second, and the third conductive materials 312A, 312B, and 312C. Accordingly, when a user touches the conductive material 310, the touch sensitive effect to the first touch sensitive screen module 122A and the second touch sensitive screen module 122B is bigger. When a user touches the first, the second, or the third conductive materials 312A, 312B, and 312C, the touch sensitive effect to the first touch sensitive screen module 122A and the second touch sensitive screen module 122B is smaller. In some embodiments, when a user touches one of the first, the second, and the third conductive materials 312A, 312B, and 312C, this touch will not result in the touch sensitive effects of other two conductive materials.

It is clear from the embodiment of FIG. 3 that the present invention provides a touch sensitive system being able to include a single conductive material connecting to multiple conductive materials by multiple conductive lines respectively. The multiple conductive materials overlap on multiple touch sensitive screen modules, and the single conductive material does not overlap on the multiple touch sensitive screen modules. When a user touches the single conductive material, it seems like to touch multiple touch sensitive screen module at the same time.

Moreover, it is clear from the embodiment of FIG. 3 that the present invention provides a touch sensitive system being able to include a shielding conductive material on its touch sensitive screen module. When a user touches the shielding conductive material, since the shape and/or size of the shielding conductive material would be regarded as like a palm by the touch sensitive screen module, this touch action by the user will thus be rejected. Accordingly, the user touching in the touch sensitive screen module shielded or covered by the shielding conductive material would be excluded.

Referring to FIG. 3, in an embodiment of the present invention, it provides a touch sensitive system attaching to a transparent material (such as component 110). The touch sensitive system includes an electronic device (such as component 120A) and a shielding conductive material (such as component 330). The electronic device further includes a touch sensitive screen module (such as component 122A) having no cover glass and placed or set up behind the transparent material; and a touch sensitive control module coupled to the touch sensitive screen module, having palm rejection function. The shielding conductive material attaches to the transparent material and shields at least part of the touch sensitive screen module. In case an external conductive object approximating or touching the shielding conductive material, the touch sensitive control module determines that the at least part of the touch sensitive screen module is touched by a palm.

In some embodiments, the shielding conductive material is transparent.

In some embodiments, the touch sensitive control module determines that the at least part of the touch sensitive screen module is touched by the palm according to size and/or shape of the at least part of the touch sensitive screen module.

In some embodiments, the shielding conductive material attaches in front of the transparent material, the shielding conductive material and the touch sensitive screen module are blocked by the transparent material.

Figure 4:
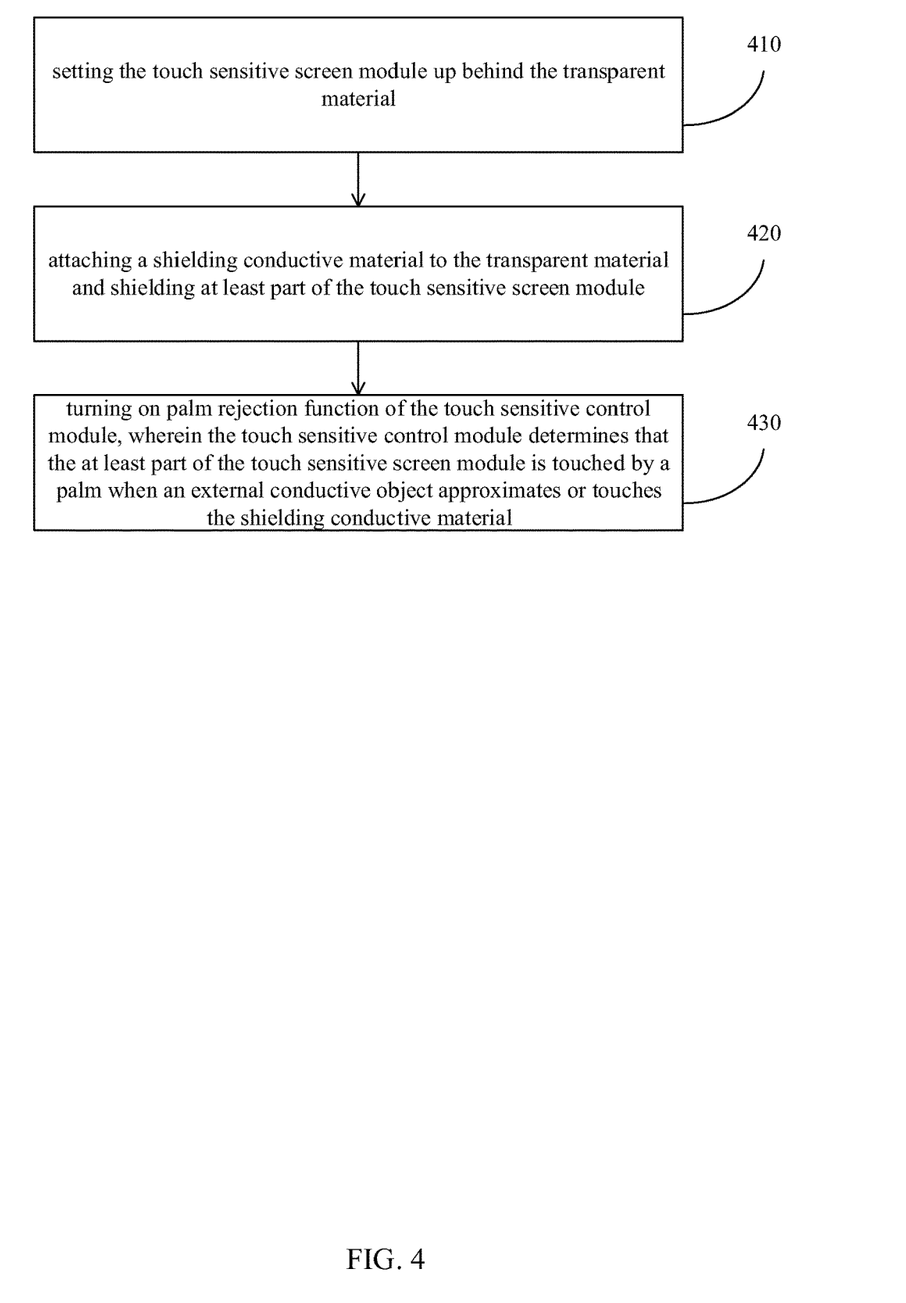
FIG. 4 illustrates a flowchart of a touch sensitive method for a touch sensitive system attaching to a transparent material according to an embodiment of the present invention.

Referring to FIG. 4, a flowchart of a touch sensitive method for a touch sensitive system attaching to a transparent material according to an embodiment of the present invention is illustrated. The touch sensitive system includes a touch sensitive screen module and a touch sensitive control module coupled to the touch sensitive screen module. Wherein the touch sensitive screen module has no cover glass. The touch sensitive method includes the following steps, and except for causal relationship, the present invention is not limited to the execution order of these steps.

In step 410: setting the touch sensitive screen module up behind the transparent material.

In step 420: attaching a shielding conductive material to the transparent material and shielding at least part of the touch sensitive screen module.

In step 430: turning on palm rejection function of the touch sensitive control module, wherein the touch sensitive control module determines that the at least part of the touch sensitive screen module is touched by a palm when an external conductive object approximates or touches the shielding conductive material.

In some embodiments, the shielding conductive material is transparent.

In some embodiments, the touch sensitive control module determines that the at least part of the touch sensitive screen module is touched by the palm according to size and/or shape of the at least part of the touch sensitive screen module.

In some embodiments, the shielding conductive material attaches in front of the transparent material, and the shielding conductive material and the touch sensitive screen module are blocked by the transparent material.

Referring to FIG. 3, in an embodiment of the present invention, it provides a touch sensitive system attaching to a transparent material (such as component 110). The touch sensitive system includes a first electronic device (such as component 120A) and a second electronic device (such as component 120B). The first electronic device further includes: a first touch sensitive screen module (such as component 122A) placed or set up behind the transparent material, wherein the first touch sensitive screen module has no cover glass; a first touch sensitive control module coupled to the first touch sensitive screen module; and a first processor module coupled to the first touch sensitive screen module and the first touch sensitive control module, wherein the first processor module is configured to perform a first program to make the first touch sensitive screen module display a first button (such as component 322) and to perform a first function in response to the first button when the first touch sensitive control module reports that the first button has been touched. The second electronic device further includes: a second touch sensitive screen module (such as component 122B) placed or set up behind the transparent material, wherein the second touch sensitive screen module has no cover glass; a second sensitive control module coupled to the second touch sensitive screen module; and a second processor module coupled to the second touch sensitive screen module and the second touch sensitive control module, wherein the second processor module is configured to perform a second program to make the second touch sensitive screen module display a second button (such as component 324) and to perform a second function in response to the second button when the second touch sensitive control module reports that the second button has been touched. The touch sensitive system further includes: a first conductive material (such as component 312A) attaching to the transparent material in response to the first button; a second conductive material (such as component 312B) attaching to the transparent material in response to the second button; and a third conductive material (such as component 310) attaching to the transparent material excepting for the zones of the first touch sensitive screen module and the second touch sensitive screen module, wherein the third conductive material connects the first conductive material and the second conductive material by a first conductive line and a second conductive line, respectively. Wherein, when an external conductive object approximates or touches the third conductive material, the first processor module performs the first function and the second processor module performs the second function.

In some embodiments, the third conductive material includes non-transparent icon and/or text for providing users to read.

In some embodiments, parts of or all the following components are transparent: the first conductive material; the second conductive material; the first conductive line; and the second conductive line.

In some embodiments, the second button is on the edge of the second touch sensitive screen module.

In some embodiments, the first button is not on the edge of the first touch sensitive screen module.

Figure 5:
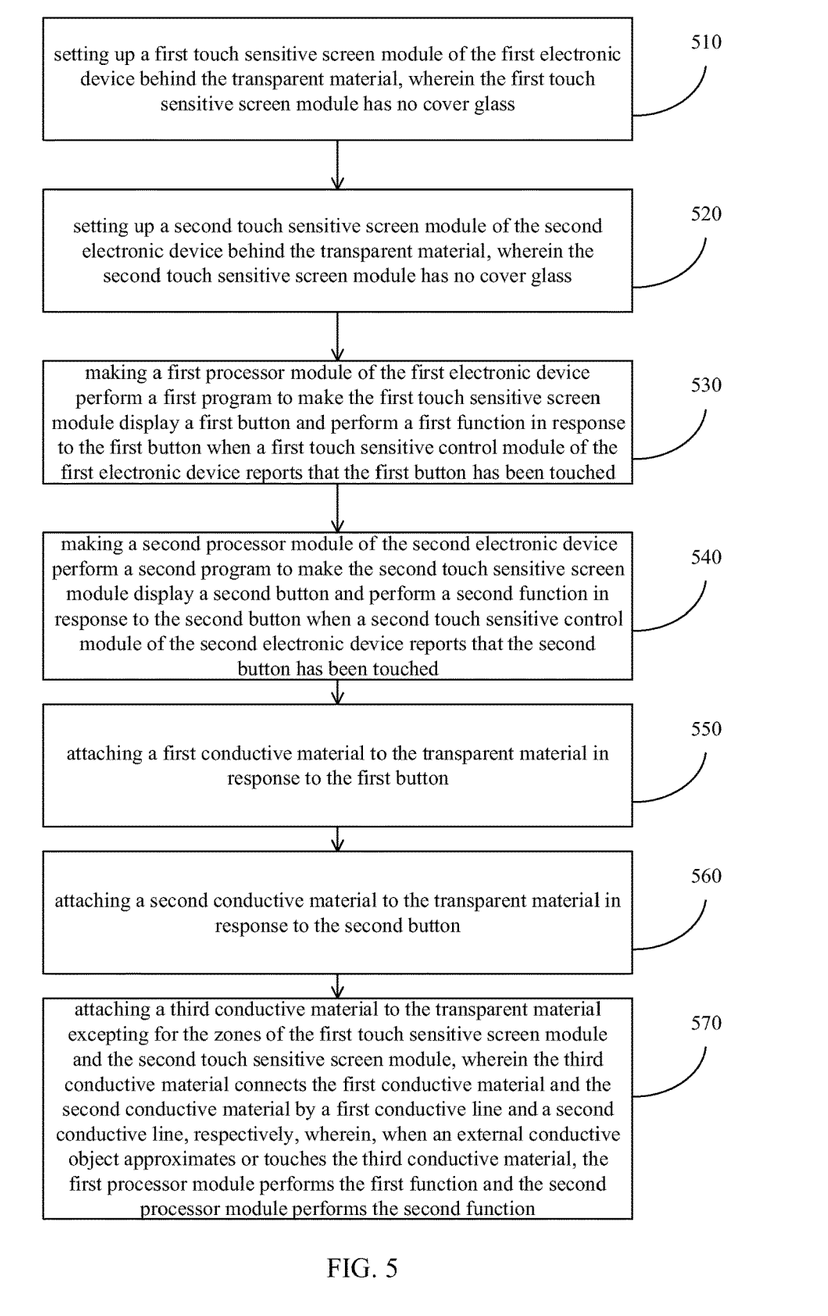
FIG. 5 illustrates a flowchart of a touch sensitive method for a touch sensitive system attaching to a transparent material according to an embodiment of the present invention.

Referring to FIG. 5, a flowchart of a touch sensitive method for a touch sensitive system attaching to a transparent material according to an embodiment of the present invention is illustrated. The touch sensitive system includes a first electronic device and a second electronic device. The touch sensitive method includes the following steps, and except for causal relationship, the present invention is not limited to the execution order of these steps.

In step 510: setting up a first touch sensitive screen module of the first electronic device behind the transparent material, wherein the first touch sensitive screen module has no cover glass.

In step 520: setting up a second touch sensitive screen module of the second electronic device behind the transparent material, wherein the second touch sensitive screen module has no cover glass.

In step 530: making a first processor module of the first electronic device perform a first program to make the first touch sensitive screen module display a first button and perform a first function in response to the first button when a first touch sensitive control module of the first electronic device reports that the first button has been touched.

In step 540: making a second processor module of the second electronic device perform a second program to make the second touch sensitive screen module display a second button and perform a second function in response to the second button when a second touch sensitive control module of the second electronic device reports that the second button has been touched.

In step 550: attaching a first conductive material to the transparent material in response to the first button.

In step 560: attaching a second conductive material to the transparent material in response to the second button.

In step 570: attaching a third conductive material to the transparent material excepting for the zones of the first touch sensitive screen module and the second touch sensitive screen module, wherein the third conductive material connects the first conductive material and the second conductive material by a first conductive line and a second conductive line, respectively, wherein, when an external conductive object approximates or touches the third conductive material, the first processor module performs the first function and the second processor module performs the second function.

In some embodiments, the third conductive material includes non-transparent icon and/or text for providing users to read.

In some embodiments, parts of or all the following components are transparent: the first conductive material; the second conductive material; the first conductive line; and the second conductive line.

In some embodiments, the second button is on the edge of the second touch sensitive screen module.

In some embodiments, the first button is not on the edge of the first touch sensitive screen module.

Referring to FIG. 3, in an embodiment of the present invention, it provides a touch sensitive system attaching to a transparent material (such as component 110). The touch sensitive system includes an electronic device (such as component 120B). The electronic device further includes: a touch sensitive screen module (such as component 122B) placed or set up behind the transparent material, wherein the touch sensitive screen module has no cover glass; a touch sensitive control module coupled to the touch sensitive screen module; and a processor module coupled to the touch sensitive screen module and the touch sensitive control module, wherein the processor module is configured to perform a program to make the touch sensitive screen module display a first button (such as component 324) and a second button (such as component 326), and to perform a first function in response to the first button when the touch sensitive control module reports that the first button has been touched, and to perform a second function in response to the second button when the touch sensitive control module reports that the second button has been touched, and to perform a third function when the touch sensitive control module reports that the first and the second buttons have been touched simultaneously. The touch sensitive system further includes: a first conductive material (such as component 312B) attaching to the transparent material in response to the first button; a second conductive material (such as component 312C) attaching to the transparent material in response to the second button; and a third conductive material (such as component 310) attaching to the transparent material excepting for the zones of the touch sensitive screen module, wherein the third conductive material connects the first conductive material and the second conductive material by a first conductive line and a second conductive line, respectively. Wherein, when an external conductive object approximates or touches the third conductive material, the processor module performs the third function.

Figure 6:
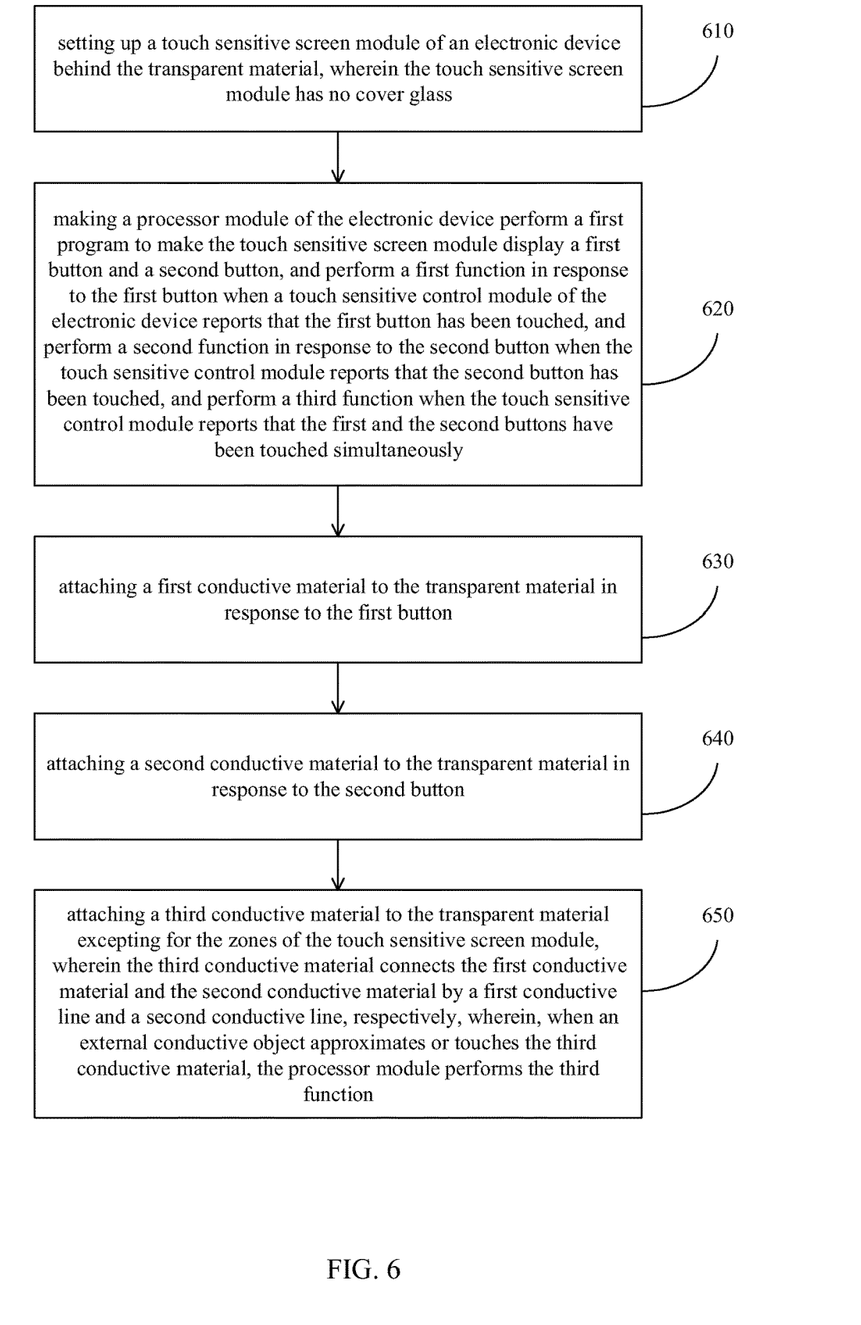
FIG. 6 illustrates a flowchart of a touch sensitive method for a touch sensitive system attaching to a transparent material according to an embodiment of the present invention.

Referring to FIG. 6, a flowchart of a touch sensitive method for a touch sensitive system attaching to a transparent material according to an embodiment of the present invention is illustrated. The touch sensitive method includes the following steps, and except for causal relationship, the present invention is not limited to the execution order of these steps.

In step 610: setting up a touch sensitive screen module of an electronic device behind the transparent material, wherein the touch sensitive screen module has no cover glass.

In step 620: making a processor module of the electronic device perform a first program to make the touch sensitive screen module display a first button and a second button, and perform a first function in response to the first button when a touch sensitive control module of the electronic device reports that the first button has been touched, and perform a second function in response to the second button when the touch sensitive control module reports that the second button has been touched, and perform a third function when the touch sensitive control module reports that the first and the second buttons have been touched simultaneously.

In step 630: attaching a first conductive material to the transparent material in response to the first button.

In step 640: attaching a second conductive material to the transparent material in response to the second button.

In step 650: attaching a third conductive material to the transparent material excepting for the zones of the touch sensitive screen module, wherein the third conductive material connects the first conductive material and the second conductive material by a first conductive line and a second conductive line, respectively, wherein, when an external conductive object approximates or touches the third conductive material, the processor module performs the third function.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A touch sensitive system attaching to a transparent material, the touch sensitive system comprising:
    an electronic device, further comprising:
        a touch sensitive screen module, placed behind the transparent material, the touch sensitive screen module having no cover glass; and
        a touch sensitive control module, coupled to the touch sensitive screen module, the touch sensitive control module having palm rejection function; and
    a shielding conductive material, attaching to the transparent material and shielding at least part of the touch sensitive screen module, wherein when an external conductive object approximates or touches the shielding conductive material, the touch sensitive control module determines that the at least part of the touch sensitive screen module is touched by a palm.

2. The touch sensitive system of claim 1, wherein the shielding conductive material is transparent.

3. The touch sensitive system of claim 1, wherein the touch sensitive control module determines that the at least part of the touch sensitive screen module is touched by the palm according to size and/or shape of the at least part of the touch sensitive screen module.

4. The touch sensitive system of claim 1, wherein the shielding conductive material attaches in front of the transparent material, the shielding conductive material and the touch sensitive screen module are blocked by the transparent material.

5. A touch sensitive method for a touch sensitive system attaching to a transparent material, the touch sensitive system including a touch sensitive screen module and a touch sensitive control module coupled to the touch sensitive screen module, the touch sensitive screen module having no cover glass, the touch sensitive method comprising:
    setting the touch sensitive screen module up behind the transparent material;
    attaching a shielding conductive material to the transparent material and shielding at least part of the touch sensitive screen module; and
    turning on palm rejection function of the touch sensitive control module, wherein the touch sensitive control module determines that the at least part of the touch sensitive screen module is touched by a palm when an external conductive object approximates or touches the shielding conductive material.

6. The touch sensitive method of claim 5, wherein the shielding conductive material is transparent.

7. The touch sensitive method of claim 5, wherein the touch sensitive control module determines that the at least part of the touch sensitive screen module is touched by the palm according to size and/or shape of the at least part of the touch sensitive screen module.

8. The touch sensitive method of claim 5, wherein the shielding conductive material attaches in front of the transparent material, the shielding conductive material and the touch sensitive screen module are blocked by the transparent material.

9. A touch sensitive system attaching to a transparent material, the touch sensitive system comprising:
    a first electronic device, further comprising:
        a first touch sensitive screen module, set up behind the transparent material, the first touch sensitive screen module having no cover glass;
        a first touch sensitive control module, coupled to the first touch sensitive screen module; and a first processor module, coupled to the first touch sensitive screen module and the first touch sensitive control module, the first processor module configured to perform a first program to make the first touch sensitive screen module display a first button, and to perform a first function in response to the first button when the first touch sensitive control module reports that the first button has been touched;

a second electronic device, further comprising:
  a second touch sensitive screen module, set up behind the transparent material, the second touch sensitive screen module having no cover glass;
  a second touch sensitive control module, coupled to the second touch sensitive screen module; and
  a second processor module, coupled to the second touch sensitive screen module and the second touch sensitive control module, the second processor module configured to perform a second program to make the second touch sensitive screen module display a second button, and to perform a second function in response to the second button when the second touch sensitive control module reports that the second button has been touched;
a first conductive material, attaching to the transparent material in response to the first button;
a second conductive material, attaching to the transparent material in response to the second button; and
a third conductive material, attaching to the transparent material excepting for the zones of the first touch sensitive screen module and the second touch sensitive screen module, the third conductive material connecting the first conductive material and the second conductive material by a first conductive line and a second conductive line, respectively,
wherein when an external conductive object approximates or touches the third conductive material, the first processor module performs the first function and the second processor module performs the second function.

10. The touch sensitive system of claim 9, wherein the third conductive material comprises non-transparent icon and/or text for reading.

11. The touch sensitive system of claim 9, wherein parts of or all the following components are transparent:
  the first conductive material;
  the second conductive material;
  the first conductive line; and
  the second conductive line.

12. The touch sensitive system of claim 9, wherein the second button is on the edge of the second touch sensitive screen module.

13. The touch sensitive system of claim 9, wherein the first button is not on the edge of the first touch sensitive screen module.

14. A touch sensitive method for a touch sensitive system attaching to a transparent material, the touch sensitive system comprising a first electronic device and a second electronic device, the touch sensitive method comprising:
  setting up a first touch sensitive screen module of the first electronic device behind the transparent material, wherein the first touch sensitive screen module has no cover glass;
  setting up a second touch sensitive screen module of the second electronic device behind the transparent material, wherein the second touch sensitive screen module has no cover glass;
  making a first processor module of the first electronic device perform a first program to make the first touch sensitive screen module display a first button, and perform a first function in response to the first button when a first touch sensitive control module of the first electronic device reports that the first button has been touched;
  making a second processor module of the second electronic device perform a second program to make the second touch sensitive screen module display a second button, and perform a second function in response to the second button when a second touch sensitive control module of the second electronic device reports that the second button has been touched;
  attaching a first conductive material to the transparent material in response to the first button;
  attaching a second conductive material to the transparent material in response to the second button; and
  attaching a third conductive material to the transparent material excepting for the zones of the first touch sensitive screen module and the second touch sensitive screen module, wherein the third conductive material connects the first conductive material and the second conductive material by a first conductive line and a second conductive line, respectively,
  wherein when an external conductive object approximates or touches the third conductive material, the first processor module performs the first function and the second processor module performs the second function.

15. The touch sensitive method of claim 14, wherein the third conductive material comprises non-transparent icon and/or text for reading.

16. The touch sensitive method of claim 14, wherein parts of or all the following components are transparent:
  the first conductive material;
  the second conductive material;
  the first conductive line; and
  the second conductive line.

17. The touch sensitive method of claim 14, wherein the second button is on the edge of the second touch sensitive screen module.

18. The touch sensitive method of claim 14, wherein the first button is not on the edge of the first touch sensitive screen module.

19. A touch sensitive system attaching to a transparent material, the touch sensitive system comprising:
  an electronic device, further comprising:
    a touch sensitive screen module, set up behind the transparent material, the touch sensitive screen module having no cover glass;
    a touch sensitive control module, coupled to the touch sensitive screen module; and
    a processor module, coupled to the touch sensitive screen module and the touch sensitive control module, the processor module configured to perform a program to make the touch sensitive screen module display a first button and a second button, and to perform a first function in response to the first button when the touch sensitive control module reports that the first button has been touched, and to perform a second function in response to the second button when the touch sensitive control module reports that the second button has been touched, and to perform a third function when the touch sensitive control module reports that the first and the second buttons have been touched simultaneously;
  a first conductive material, attaching to the transparent material in response to the first button;

a second conductive material, attaching to the transparent material in response to the second button; and a third conductive material, attaching to the transparent material excepting for the zones of the touch sensitive screen module, the third conductive material connecting the first conductive material and the second conductive material by a first conductive line and a second conductive line, respectively, wherein when an external conductive object approximates or touches the third conductive material, the processor module performs the third function.

20. A touch sensitive method for a touch sensitive system attaching to a transparent material, the touch sensitive method comprising:

setting up a touch sensitive screen module of an electronic device behind the transparent material, wherein the touch sensitive screen module has no cover glass;

making a processor module of the electronic device perform a program to make the touch sensitive screen module display a first button and a second button, and perform a first function in response to the first button when a touch sensitive control module of the electronic device reports that the first button has been touched, and perform a second function in response to the second button when the touch sensitive control module reports that the second button has been touched, and perform a third function when the touch sensitive control module reports that the first and the second buttons have been touched simultaneously;

attaching a first conductive material to the transparent material in response to the first button;

attaching a second conductive material to the transparent material in response to the second button; and attaching a third conductive material to the transparent material excepting for the zones of the touch sensitive screen module, wherein the third conductive material connects the first conductive material and the second conductive material by a first conductive line and a second conductive line, respectively, wherein when an external conductive object approximates or touches the third conductive material, the processor module performs the third function.

* * * * *